(12) United States Patent
Karaoguz et al.

(10) Patent No.: US 7,565,173 B2
(45) Date of Patent: *Jul. 21, 2009

(54) DYNAMIC MIMO RESOURCE ALLOCATION DURING A SINGLE COMMUNICATION

(75) Inventors: Jeyhan Karaoguz, Irvine, CA (US); Nambirajan Seshadri, Irvine, CA (US); James D. Bennett, Prague (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/855,252

(22) Filed: Sep. 14, 2007

(65) Prior Publication Data

US 2008/0002781 A1      Jan. 3, 2008

Related U.S. Application Data

(63) Continuation of application No. 11/092,383, filed on Mar. 29, 2005, now Pat. No. 7,299,070.

(60) Provisional application No. 60/601,342, filed on Aug. 13, 2004.

(51) Int. Cl.
 *H04M 1/00* (2006.01)
(52) U.S. Cl. ............... 455/562.1; 456/272; 456/132
(58) Field of Classification Search ............ 455/562.1, 455/272–279.1, 132–137
See application file for complete search history.

(56) References Cited

U.S. PATENT DOCUMENTS

| | | | |
|---|---|---|---|
| 6,744,743 B2 | 6/2004 | Walton et al. | |
| 6,751,187 B2 * | 6/2004 | Walton et al. | .............. 370/210 |
| 6,802,035 B2 | 10/2004 | Catreux | |
| 7,047,016 B2 | 5/2006 | Walton et al. | |
| 7,280,804 B2 | 10/2007 | Jacobsen | |
| 7,301,924 B1 | 11/2007 | Gurbuz | |
| 2002/0193146 A1 | 12/2002 | Wallace | |
| 2003/0223391 A1 | 12/2003 | Malaender | |
| 2005/0047384 A1 | 3/2005 | Wax | |
| 2005/0101352 A1 | 5/2005 | Logothetis | |
| 2005/0170862 A1 | 8/2005 | Fukushima | |
| 2005/0232208 A1 | 10/2005 | Hansen | |
| 2006/0121946 A1 | 6/2006 | Walton | |

FOREIGN PATENT DOCUMENTS

CN            1215514            4/1999

* cited by examiner

*Primary Examiner*—Lester Kincaid
*Assistant Examiner*—Sayed T Zewari
(74) *Attorney, Agent, or Firm*—McAndrews, Held & Malloy, Ltd.

(57) ABSTRACT

A system and method for providing dynamic allocation of MIMO communication resources during a single communication. Various aspects of the present invention may comprise determining a first set of MIMO communication resources to utilize for communicating a first portion of a unit of information. The first set of MIMO communication resources may be allocated for communicating the first portion of the unit of information. A second set of MIMO communication resources may be determined to utilize for communicating a second portion of the unit of information, where the second set of MIMO communication resources is different from the first set of MIMO communication resources. The second set of MIMO communication resources may be allocated for communicating the second portion of the unit of information. The first and second portions of the unit of information may, for example, be communicated consecutively or concurrently.

58 Claims, 5 Drawing Sheets

DYNAMIC MIMO RESOURCE ALLOCATION DURING A SINGLE COMMUNICATION

CROSS-REFERENCE TO RELATED APPLICATIONS/INCORPORATION BY REFERENCE

This patent application is a continuation of U.S. patent application Ser. No. 11/092,383 entitled "DYNAMIC MIMO RESOURCE ALLOCATION DURING A SINGLE COMMUNICATION," filed on Mar. 29, 2005 and issued on Nov. 20, 2007 as U.S. Pat. No. 7,299,070, which makes reference to, claims priority to and claims benefit from U.S. provisional patent application Ser. No. 60/601,342, filed Aug. 13, 2004, and titled "DYNAMIC MIMO RESOURCE ALLOCATION ACROSS A SINGLE COMMUNICATION," the contents of which are hereby incorporated herein by reference in their entirety. This patent application is related to U.S. patent application Ser. No. 11/092,194, filed Mar.29, 2005, entitled "DYNAMIC RECONFIGURATION OF COMMUNICATION RESOURCES IN A MULTI-TRANSCEIVER CONFIGURATION"and U.S. patent application Ser. No. 11/092,349, filed Mar. 29, 2005, entitled "MULTI-TRANSCEIVER SYSTEM WITH MIMO AND BEAM-FORMING CAPABILITY".

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Various communication systems may utilize single transmission path communications or multiple transmission path communications (e.g., Multiple Input Multiple Output "MIMO" communication). MIMO communication generally involves utilizing a plurality of antennas, which add a spatial dimension to the frequency and time (or code) communication dimensions, which are commonly utilized. Various MIMO communication resources (e.g., antennas, transceivers, codecs, etc.) may be utilized for a communication.

Various portions of a communicated unit of information may correspond to different respective communication needs. For example, certain portions of a unit of information may correspond to a higher communication priority than other portions. For example and without limitation, a multimedia communication may comprise audio and video information, where the audio information is more (or less) important to the overall communication than the video information. Also for example, a particular communication may comprise the primary information being communicated along with information that generally supports communication of the primary information (e.g., packet header information and training information), where the communication support information may be more (or less) important to the overall communication than the primary information.

During the communication of a unit of information, communication conditions or constraints may vary. For example and without limitation, noise (natural and man-made), energy supply, quality goals and available bandwidth may change. Also for example, the nature of the information being communicated, geographical position of communicating systems and multi-path conditions may change.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for providing dynamic allocation of MIMO communication resources during a single communication, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
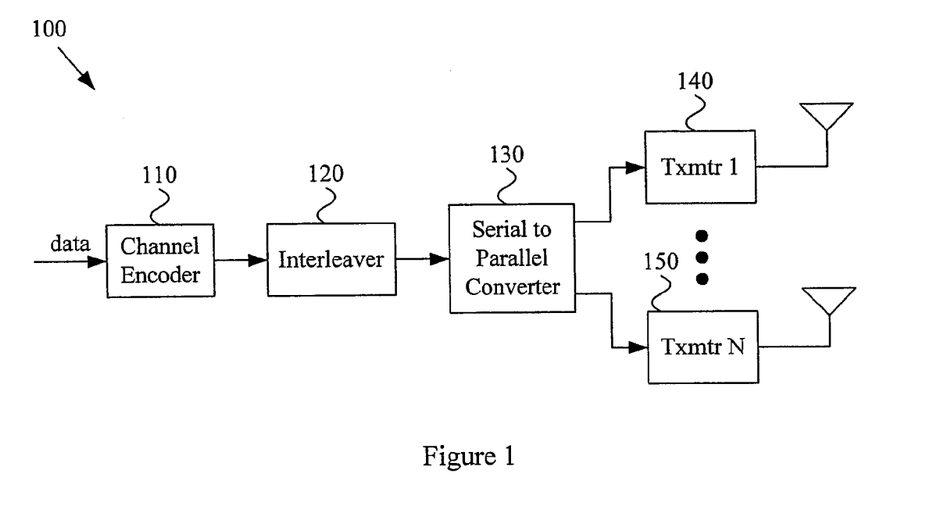
FIG. 1 is a diagram illustrating an exemplary MIMO transmitting configuration.
Figure 2:
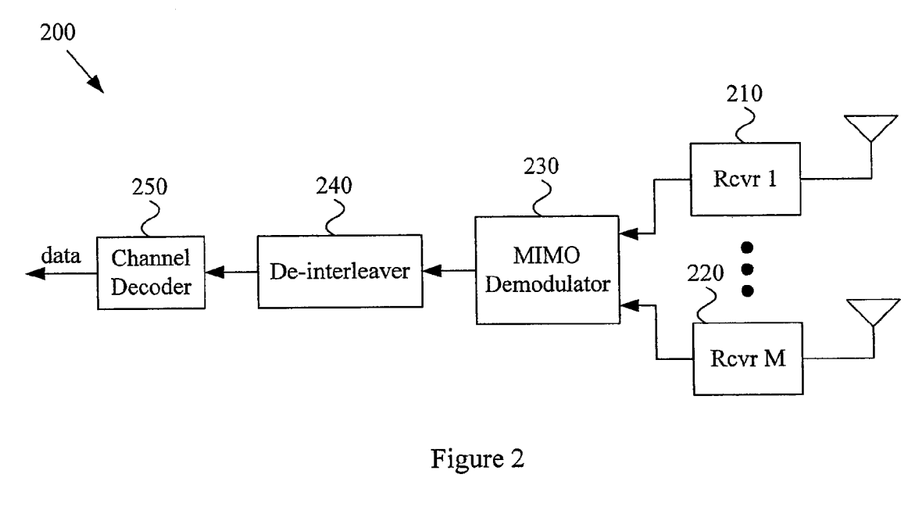
FIG. 2 is a diagram illustrating an exemplary MIMO receiving configuration.

The following discussion may illustrate various aspects of the present invention by referring to communication systems having Multiple-Input-Multiple-Output ("MIMO") communication capability. FIGS. 1 and 2 illustrate basic MIMO transmitting and receiving configurations, respectively. Note, however, that the scope of various aspects of the present invention should not be limited by characteristics of particular MIMO system configurations.

FIG. 1 is a diagram illustrating an exemplary communication system 100 having a Multiple-Input-Multiple-Output ("MIMO") transmitting configuration. The channel encoder 110 receives data. The data may comprise any of a variety of data types, including but not limited to, audio data, video data, textual data, graphical data, pictorial data, etc. The channel encoder 110 may comprise any of a variety of encoder types. For example and without limitation, the channel encoder 110 may comprise characteristics of a conventional encoder, error correction encoder, MIMO encoder, etc.

The exemplary system 100 may comprise an interleaver 120 that receives the encoded data from the channel encoder 110. The interleaver 120 may, for example, perform interleaving to spread errors. The exemplary system 100 may comprise a serial-to-parallel converter 130 that divides the single data stream out of the interleaver 120 (or channel encoder 110) into a plurality of (e.g., up to N) parallel paths. The outputs of the serial-to-parallel converter 130 may be coupled to a plurality of transmitters (e.g., transmitter 140 through transmitter 150) and respective antennas for transmission.

FIG. 2 is a diagram illustrating an exemplary communication system 200 having an exemplary MIMO receiving configuration. A plurality of transmitted signals may arrive at the plurality of (e.g., up to M) antennas and respective receivers (e.g., receiver 210 through receiver 220). The receivers 210-220 may provide the simultaneously received signals to a MIMO demodulator 230. The MIMO demodulator 230 may provide a serial stream of information to a de-interleaver 240 and to a channel decoder 250 to convert the received signals into output data.

Note that the exemplary MIMO systems illustrated in FIGS. 1 and 2 are merely illustrative examples of basic MIMO systems. It should be noted that a MIMO system may comprise many various alternative configurations. Further, it should be noted that many characteristics of MIMO systems are shared with MISO systems.

Figure 3:
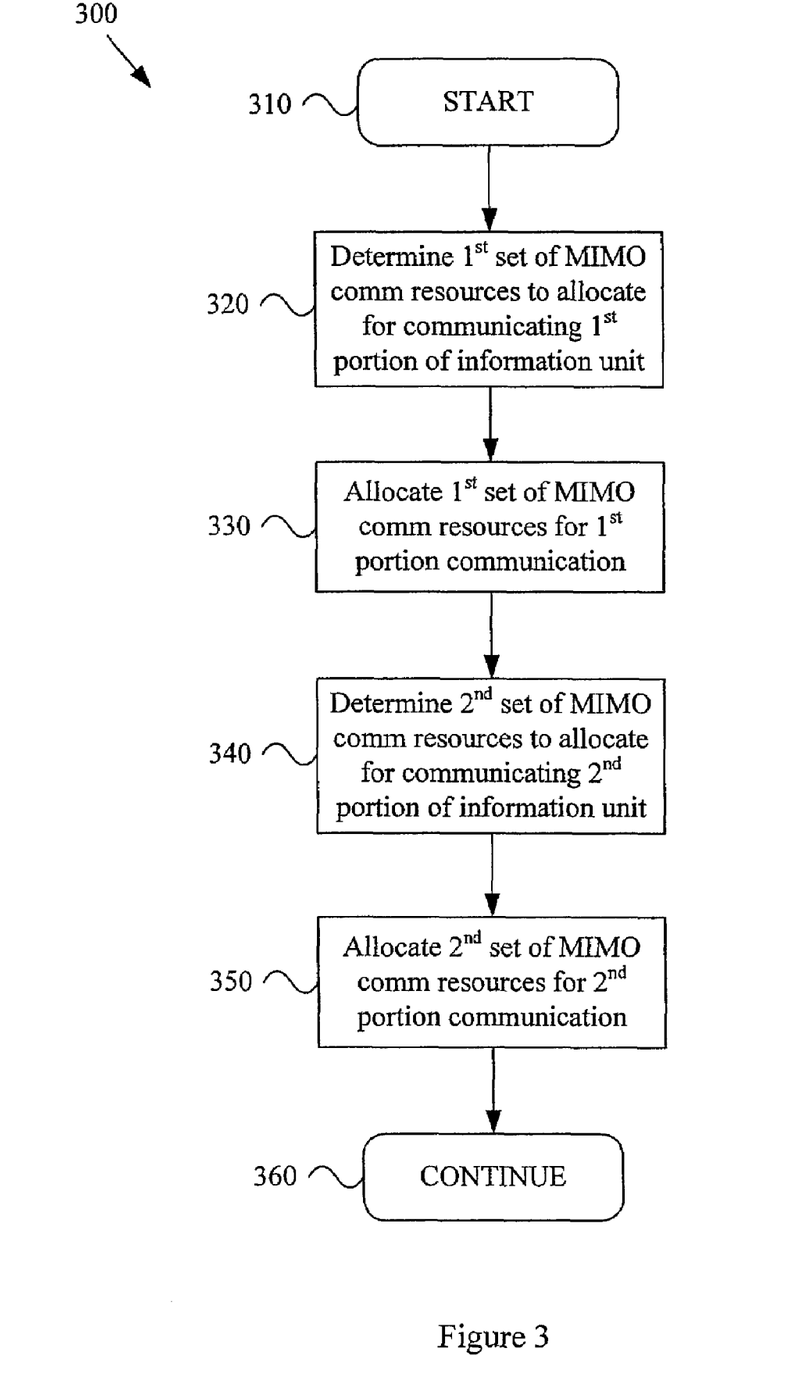
FIG. 3 is a flow diagram illustrating an exemplary method for allocating MIMO communication resources, in accordance with various aspects of the present invention.

FIG. 3 is a flow diagram illustrating an exemplary method 300 for allocating MIMO communication resources, in accordance with various aspects of the present invention. The exemplary method 300 may be implemented by any of a variety of communication systems with MIMO communication capability (e.g., that comprise a plurality of antennas and/or antenna elements). For example and without limitation, the method 300, or portions thereof may be implemented by various modules or systems of a MIMO communication network (e.g., a base station, access point, or central controller). Also for example, the method 300 may be implemented by a fixed or portable MIMO communication system that communicates with a MIMO communication network. Accordingly, the scope of various aspects of the present invention should not be limited by characteristics of a particular communication system that may implement the exemplary method 300.

The following discussion may refer to communication of a "unit of information." A unit of information may generally be considered to be a quantifiable amount of related information. For example and without limitation, a unit of information may be a packet, bit, symbol, data frame, message, song, program, music video, movie, timed segment of a communication (e.g., n-seconds of a phone conversation), etc. Such information may comprise characteristics of any of a variety of types of information (e.g., textual, graphical, multi-media, video, audio, pictorial, general data, telephone call, etc.). The scope of various aspects of the present invention should not be limited by characteristics of a particular type of information or by any arbitrary notion of what a unit of such information may comprise.

The following discussion may also refer to one or more portions of a unit of information. A portion of a unit of information may comprise characteristics of any of a variety of divisions of a unit of information. For example and without limitation, a portion of a unit of information may correspond to a time-divided portion of the unit of information. Also for example, a portion of a unit of information may correspond to one or more media of a multi-media communication (e.g., an audio component or a video component). Further for example, a portion of a unit of information may correspond to communication-support information (e.g., packet ID, frame ID, protocol ID, program ID, security information, etc.). Still further for example, a portion of a unit of information may correspond to one or more channels of a multi-channel communication. Also for example, a portion of a unit of information may correspond to one or more parallel streams of a multi-stream communication. Also for example, a portion of a unit of information may correspond to a relatively higher or lower priority component of the unit of information.

For illustrative purposes, the following discussion may generally refer to first and second portions of information. Two-portion examples are generally presented for illustrative clarity and should not limit the scope of various aspects of the present invention to two-portion scenarios. For example, various aspects of the present invention are readily extensible to three-portion and n-portion scenarios.

In a first non-limiting exemplary scenario, a first portion of a unit of information may primarily comprise communication-support information, and a second portion of the unit of information may primarily comprise general communication information (e.g., the main information to be conveyed in the communication). For example, a first portion of a unit of information may comprise packet identity or program identity information, and a second portion of the unit of information may comprise information describing a multi-media program.

In another non-limiting exemplary scenario, a first portion of a unit of information may primarily comprise first medium information of a multi-media communication, and a second portion of the unit of information may primarily comprise second medium information of the multi-media communication. For example, a first portion of a unit of information may generally comprise audio information, and a second portion of the unit of information may generally comprise video information. Also for example, a first portion of a unit of information may generally comprise basic audio information, a second portion of the unit of information may comprise high-fidelity audio information, a third portion of the unit of information may comprise standard video information, and a fourth portion of the unit of information may comprise high-definition video information.

In yet another non-limiting exemplary scenario, a first portion of a unit of information may comprise a first one or more of a plurality of parallel streams of information associated with a unit of information, and a second portion of the unit of information may comprise a second one or more of the plurality of parallel streams. In still another non-limiting exemplary scenario, a first portion of the unit of information may comprise a first serial time segment of the unit of information, and a second portion of the unit of information may comprise a second serial time segment of the unit of information. For example, a first portion of the unit of information may primarily comprise a first n seconds of a telephone conversation, and a second portion of the unit of information may primarily comprise a second m seconds of the telephone conversation.

In general, a portion of a unit of information may comprise characteristics of any of a variety of divisions of a unit of information. Accordingly, the scope of various aspects of the present invention should not be limited by characteristics of a particular portion or component of a unit of information.

The following discussion may also generally refer to MIMO communication resources. A MIMO communication resource may generally be considered to be a hardware or software resource, or portion thereof, that is generally associated with performing MIMO communications. For example and without limitation, exemplary MIMO communication resources may comprise antennas, transceivers, encoders/decoders, mappers, channels, portions of various resources, etc. Also for example, an exemplary MIMO communication resource may comprise a timed portion of a hardware and/or software resource. Accordingly, the scope of various aspects of the present invention should not be limited by characteristics of any particular MIMO communication resource.

The exemplary method 300 may begin executing at step 310. The exemplary method 300 (and other methods discussed herein, for example, exemplary methods 400-500) may begin executing for any of a variety of reasons. For example and without limitation, the exemplary method 300 may begin in response to a user or automated input initiating a communication. Also for example, the exemplary method 300 may begin in response to a message arriving from another communication system. Further for example, the exemplary method 300 may begin in response to one or more detected or determined communication environment conditions. Still further for example, the exemplary method 300 may begin in response to timer expiration. Accordingly, the scope of various aspects of the present invention should not be limited by characteristics of any particular initiating cause or condition.

Portions of the following discussion will include illustrations of a communication system implementing the exemplary method 300 communicating with a second communication system. Such a one-to-one communication scenario is presented for illustrative clarity and should not limit the scope of various aspects of the present invention to characteristics of a one-to-one communication scenario. For example and without limitation, various aspects of the present invention also may apply to broadcast and multi-cast communication scenarios. Additionally, portions of the following discussion may focus on the transmission of information or the reception of information, depending on the particular scenario. It should be noted that providing an illustration based on transmission or reception should not limit the scope of various aspects of the present invention to one of transmission or reception. Various aspects of the present invention are readily extensible to receiving and/or transmitting information.

The exemplary method 300 may, at step 320, comprise determining a first set of MIMO communication resources to utilize for communicating a first portion of a unit of information. Various general characteristics of portions of a unit of information were discussed previously.

Step 320 may, for example and without limitation, comprise determining the first (or $2^{nd}$ or $n^{th}$) portion of the unit of information. Such a determination may be performed in any of a variety of manners. Various exemplary characteristics of such a determination will be discussed later with regard to the exemplary methods 400, 500 illustrated in FIGS. 4 and 5.

The first set of MIMO communication resources may comprise any of a variety of MIMO communication resources or one or more portions thereof. For example and without limitation, the first set of MIMO communication resources may comprise a first plurality of antennas. In a non-limiting exemplary scenario, the first set of MIMO communication resources may comprise three of four available MIMO antennas. Also for example and without limitation, the first set of MIMO communication resources may comprise a first plurality of transceivers. In a non-limiting exemplary scenario, the first set of MIMO communication resources may comprise two of four available transceivers.

Step 320 may comprise determining the first set of MIMO communication resources in any of a variety of manners. For example and without limitation, step 320 may comprise determining the minimum number of MIMO communication resources necessary to meet minimum communication quality goals for the first portion of the unit of information. Also for example, step 320 may comprise determining the number of MIMO communication resources that may communicate the first portion of the unit of information in the most energy-efficient manner. Further for example, step 320 may comprise determining the first set of MIMO communication resources based, at least in part, on the available MIMO communication resources at other communication systems. Accordingly, the scope of various aspects of the present invention should not be limited by characteristics of any particular manner of determining a set of MIMO communication resources.

The exemplary method 300 may, at step 330, comprise allocating the first set of MIMO communication resources for communicating the first portion of the unit of information. Step 330 may comprise performing such allocation in any of a variety of manners. Such allocating may, for example, be performed by cross-listing the first set of MIMO communication resources with the first portion of the unit of information. Also for example, such allocating may be performed utilizing allocation flags, arrays and/or tables. Accordingly, the scope of various aspects of the present invention should not be limited by characteristics of any particular manner of performing a resource allocation.

The exemplary method 300 may, at step 340, comprise determining a second set of MIMO communication resources to utilize for communicating a second portion of the unit of information, the second set of MIMO communication resources being different (i.e., at least a portion of respective set members being different) from the first set of MIMO communication resources.

As will be discussed later in the discussion of the exemplary methods 400-500 illustrated in FIGS. 4-5, such a determination may be performed at any of a variety of times and in response to any of a variety of conditions. For example and without limitation, such a determination may be performed prior to communicating the unit of information (e.g., prior to beginning communication of the first and second portions of the unit of information). Also for example, such a determination may be performed during or after communication of the first portion of the unit of information and prior to communication of the second portion of the unit of information. Accordingly, the scope of various aspects of the present invention should not be limited by characteristics of any particular timing or initiating condition for determining the second set of MIMO communication resources.

As discussed previously, the second portion of the unit of information may be related to the first portion of the unit of information in any of a variety of manners. For example and without limitation, the first and second portions may correspond to different priority information components of the unit of information. Also for example, the first and second portions may correspond to different media in a multi-media communication. Further for example the first and second portions may correspond to different types of information (e.g., communication support and/or control information and the general information to be communicated). Still further for example, the first and second portions may correspond to different resolutions or representations of a similar type of information.

In general, the second portion of the unit of information may comprise characteristics of any of a variety of divisions of the unit of information. Accordingly, the scope of various aspects of the present invention should not be limited by characteristics of a particular portion or component of a unit of information.

As mentioned previously, the second set of MIMO communication resources may be generally different (i.e., not having exactly the same membership) from the first set of MIMO communication resources. In a non-limiting exemplary scenario, the first set of MIMO communication resources might comprise all of the available antennas (e.g., and associated transceivers), while the second set of MIMO communication resources might comprise less than all of the available antennas. In another non-limiting example, the first set of MIMO communication resources might have a first and second transceiver, while the second set of MIMO communication resources might have a first, second and third transceiver. In another non-limiting example, the first set of MIMO communication resources might comprise first, second and third antennas and associated transceivers, while the second set of MIMO communication resources might comprise only a fourth antenna and associated transceiver.

In a further non-limiting example, the first set of MIMO communication resources might comprise a relatively large amount of available MIMO communication resources, and the second set of MIMO communication resources might comprise a relatively small amount of available MIMO communication resources. In another non-limiting exemplary scenario, the first set of MIMO communication resources might generally correspond to relatively high reliability communications, while the second set of MIMO communication resources might generally correspond to relatively low reliability communications. There may be overlapping members of the first and second sets of MIMO communication resources, but such overlapping membership is not necessary.

In general, the second set of MIMO communication resources may be generally different (i.e., not having exactly the same membership) from the first set of MIMO communication resources. Accordingly, the scope of various aspects of the present invention should not be limited by characteristics of particular respective memberships of the first and second sets of MIMO communication resources.

The exemplary method 300 may, at step 350, comprise allocating the second set of MIMO communication resources for communicating the second portion of the unit of information. Step 350 may comprise performing such allocation in any of a variety of manners. Such allocating may, for example, be performed by cross-listing the second set of MIMO communication resources with the second portion of the unit of information. Also for example, such allocating may be performed utilizing allocation flags, arrays and/or tables. Accordingly, the scope of various aspects of the present invention should not be limited by characteristics of any particular manner of performing a resource allocation.

The exemplary method 300 may, at step 360, comprise performing continued processing. Such continued processing may comprise characteristics of any of a large variety of continued processing. For example and without limitation, step 360 may comprise communicating the first and second portions of the unit of information utilizing the first and second sets of MIMO communication resources, respectively. As will be discussed later with regard to the exemplary methods 400, 500 illustrated in FIGS. 4-5, communicating the first and second portions of the unit of information may be performed in series or parallel.

Step 360 may, for example and without limitation, comprise performing user interface functions. Step 360 may also, for example, comprise monitoring communication quality and/or communication conditions associated with communicating the unit of information. Step 360 may also, for example, comprise waiting for additional communication to be requested. Also for example, step 360 may comprise looping execution of the method 300 back up to steps 320 or 340 for re-determination of MIMO communication resources to allocate (e.g., to communicate additional units of information, or portions thereof, or in response to detected communication conditions). Accordingly, the scope of various aspects of the present invention should not be limited by particular types of continued processing that may be performed by a system implemented the exemplary method 300.

The exemplary method 300 was presented to provide specific illustrations of generally broader aspects of the present invention. Accordingly, the scope of various aspects of the present invention should not be limited by specific characteristics of the exemplary method 300.

Figure 4:
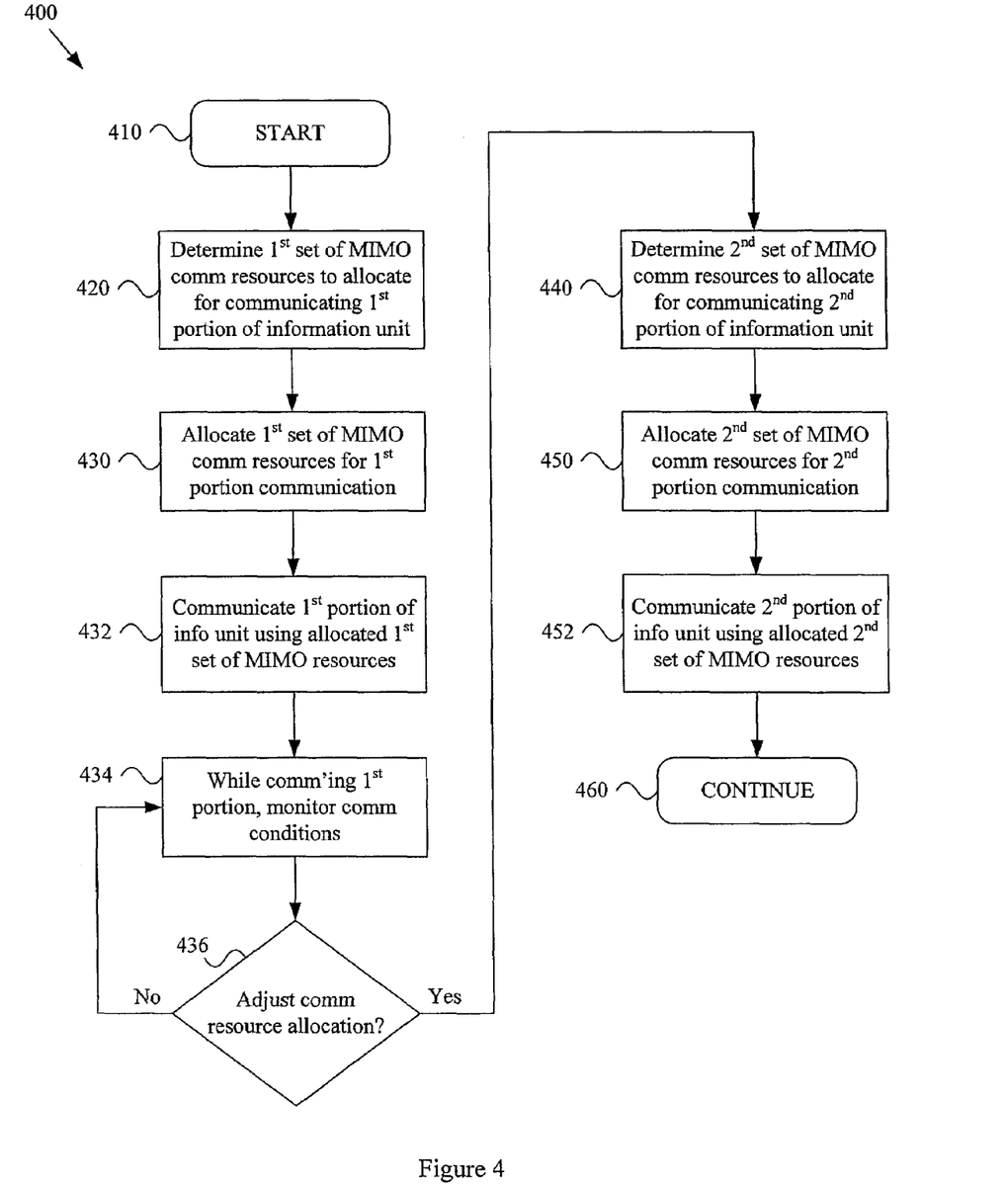
FIG. 4 is a flow diagram illustrating an exemplary method for allocating MIMO communication resources, in accordance with various aspects of the present invention.

FIG. 4 is a flow diagram illustrating an exemplary method 400 for allocating MIMO communication resources, in accordance with various aspects of the present invention. The exemplary method 400 may, for example and without limitation, share various characteristics with the exemplary method 300 illustrated in FIG. 3 and discussed previously.

The exemplary method 400 may, at step 420, comprise determining a first set of MIMO communication resources to utilize for communicating a first portion of a unit of information. Step 420 may, for example and without limitation, share various characteristics with step 320 of the exemplary method 300 illustrated in FIG. 3 and discussed previously.

Step 420 may, for example and without limitation, comprise determining the first (or $2^{nd}$ or $n^{th}$) portion of the unit of information (e.g., to which the determined first set of MIMO communication resources may correspond). Step 420 may comprise making such determination(s) in any of a variety of manners. For example and without limitation, step 420 may comprise determining the first portion of the unit of information based, at least in part, on information priority. For example, step 420 may comprise determining that a unit of information comprises information of different types, each of which having a corresponding priority. In a non-limiting exemplary scenario, step 420 may comprise determining that a first portion of a videoconference comprises audio information, which may have a higher priority than a second portion of the videoconference comprising video information. In another exemplary scenario, step 420 may comprise determining that a first portion of a telephone communication comprises communication support information, which may have a higher priority than a second portion of the telephone communication comprising general voice information.

Also for example and without limitation, step 420 may comprise determining the first portion of the unit of information to be the entire unit of information (e.g., at least for the time being). In an exemplary scenario, step 420 may comprise determining that the first portion of the unit of information is the entire unit of information until an event occurs that causes a second portion of the unit of information to be determined. Such an event may comprise characteristics of any of a variety of communication events, including by not limited to, noise conditions, user input, changing geographical location, change in communicated information, changing multi-path conditions, changing energy supply, component failure, etc.

In general, in various non-limiting exemplary scenarios, step 420 may comprise determining the first portion of the unit of information and/or other portions of the unit of information. Accordingly, the scope of various aspects of the present invention should not be limited by characteristics of any particular manner of making such determination.

The exemplary method 400 may, at step 430, comprise allocating the first set of MIMO communication resources (e.g., as determined at step 420) for communicating the first portion of the unit of information. Step 430 may, for example and without limitation, share various characteristics with step 330 of the exemplary method 300 illustrated in FIG. 3 and discussed previously.

The exemplary method 400 may, at step 432, comprise communicating the first portion of the unit of information utilizing the first set of MIMO communication resources (e.g., as determined at step 420 and allocated at step 430). Step 432 may comprise communicating the first portion of the unit of information in any of a variety of manners. For example and without limitation, step 432 may comprise encoding the first portion of the unit of information in accordance with a first MIMO encoding scheme.

In a non-limiting exemplary scenario, where the first set of MIMO communication resources includes two of four available antennas, step 432 may comprise encoding the first portion of the unit of information in accordance with an order-2 MIMO encoding scheme, and then transmitting the encoded information from the two allocated antennas. Such communication may, for example, comprise initially communicating MIMO training information to the recipient(s) of the communication. The scope of various aspects of the present invention should not be limited by any particular manner of communicating information utilizing a set of MIMO communication resources.

The exemplary method 400 may, at step 434, comprise, while communicating the first portion of the unit of information, monitoring communication conditions. Such communication conditions may comprise characteristics of any of a variety of communication conditions. For example and without limitation, the communication conditions may comprise communication environmental conditions (e.g., noise, available bandwidth, multi-path environment, location of communicating systems, etc.). Also for example, the communication conditions may comprise the nature of the information being communicated, which may change during a communication. Further for example, the communication conditions may comprise various communication constraints, such as, quality goals or requirements, energy availability or requirements, component availability or failure, etc. Accordingly, the scope of various aspects of the present invention should not be limited by characteristics of any particular communication condition that may be monitored during communication of the first portion of the unit of information.

The exemplary method 400 may, at step 436, comprise determining whether to adjust the MIMO communication resource allocation for a next (or second) portion of the unit of information. Step 436 may, for example, make such a determination based, at least in part, on communication conditions monitored at step 434. For example, a significant change in one or more communication conditions during communication of the first portion of the unit of information may warrant a change in MIMO communication resources allocated to communicate a second portion of the unit of information.

In a first non-limiting exemplary scenario, the first set of MIMO communication resources may comprise all four of four available antennas. Due to a detected change in multi-path communication conditions (e.g., a communicating system moving into a wide open area) monitored at step 434, step 436 may comprise determining that a different set of MIMO communication resources may be more appropriate for communicating a second portion of the unit of information.

In a second non-limiting exemplary scenario, the first set of MIMO communication resources may comprise two of four available antennas. Due to a detected significant increase in noise level monitored at step 434, step 436 may comprise determining that a different set of MIMO communication resources may be more appropriate for communicating a second portion of the unit of information.

In a third non-limiting exemplary scenario, the first set of MIMO communication resources may comprise three of four available transceivers. Due to a detected significant change in the amount of energy remaining for communication (e.g., monitored at step 434), step 436 may comprise determining that a different set of MIMO communication resources may be more appropriate for communicating a second portion of the unit of information (e.g., to conserve energy).

In a fourth non-limiting exemplary scenario, the first set of MIMO communication resources may comprise two of four antennas. Due to a detected user request for higher quality communications (e.g., monitored at step 434), step 436 may comprise determining that a different set of MIMO communication resources may be appropriate for communicating a second portion of the unit of information.

If an adjustment in allocated MIMO communication resources is not warranted, step 436 may comprise looping back to step 434 for continued monitoring of communication conditions. If an adjustment in allocated MIMO communication resources is warranted, step 436 may direct execution flow of the exemplary method 400 to step 440.

In general, step 436 may comprise determining whether to adjust the MIMO communication resource allocation for communicating a next (or second) portion of the unit of information. Accordingly, the scope of various aspects of the present invention should not be limited by characteristics of any particular criterion for making such determination or manner of making such determination.

The exemplary method 400 may, at step 440, comprise determining a second set of MIMO communication resources to utilize for communicating a second portion of the unit of information, the second set of MIMO communication resources being different from the first set of MIMO communication resources. Step 440 may, for example and without limitation, share various characteristics with step 340 of the exemplary method 300 illustrated in FIG. 3 and discussed previously.

Step 440 may, for example and without limitation, comprise determining the second (or $n^{th}$) portion of the unit of information (e.g., to which the determined second set of MIMO communication resources may correspond). Step 440 may comprise making such determination(s) in any of a variety of manners, some of which were discussed previously with regard to step 420.

Continuing the non-limiting exemplary scenarios discussed previously with regard to exemplary step 436, in the first non-limiting exemplary scenario, due to a detected change in multi-path communication conditions (e.g., a communicating system moving into a wide open area) monitored at step 434, step 440 may comprise determining that only two antennas or one antenna may be more appropriate for communicating a second portion of the unit of information. In the second non-limiting exemplary scenario, due to a detected significant increase in noise level monitored at step 434, step 440 may comprise determining that an increased number of MIMO communication resources may be more appropriate for communicating a second portion of the unit of information.

In the third non-limiting exemplary scenario, due to a detected reduction in the amount of energy remaining for communication (e.g., monitored at step 434), step 440 may comprise determining that a lesser amount (or greater amount, depending on the exact conditions) of MIMO communication resources may be appropriate for communicating a second portion of the unit of information. In the fourth non-limiting exemplary scenario, due to a detected user request for higher quality communications (e.g., monitored at step 434), step 440 may comprise determining that the full set of MIMO communication resources be utilized for communicating a second portion of the unit of information.

In general, exemplary step 440 may comprise determining a second set of MIMO communication resources to utilize for communicating a second portion of the unit of information, the second set of MIMO communication resources being different from the first set of MIMO communication resources. Accordingly, the scope of various aspects of the present invention should not be limited by characteristics of any particular set of MIMO communication resources or any particular manner of determining a set of MIMO communication resources to utilize for communication.

The exemplary method 400 may, at step 450, comprise allocating the second set of MIMO communication resources for communicating the second portion of the unit of information. Step 450 may, for example and without limitation, share various characteristics with exemplary step 430 and with steps 330 and 350 of the exemplary method 300 illustrated in FIG. 3 and discussed previously.

The exemplary method 400 may, at step 452, comprise communicating the second portion of the unit of information utilizing the second set of MIMO communication resources (e.g., as determined at step 440 and allocated at step 450). Step 452 may, for example and without limitation, share various characteristics with exemplary step 432 discussed previously.

The exemplary method 400 may, at step 460, comprise performing continued processing. Step 460 may, for example and without limitation, share various characteristics with step 360 of the exemplary method 300 illustrated in FIG. 3 and discussed previously. For example, step 460 may comprise performing user interface processing. Also for example, step 460 may comprise completing communication of the second portion of the unit of information utilizing the second set of MIMO communication resources. Further for example, step 460 may comprise looping execution flow of the exemplary method 400 back to step 434 for continued monitoring of communication conditions (e.g., with the potential to change to a third or $n^{th}$ set of allocated MIMO communication resources for communicating a third or $n^{th}$ portion of the unit of information). The scope of various aspects of the present invention should not be limited by characteristics of any particular continued processing.

The exemplary method 400 was presented to provide specific illustrations of generally broader aspects of the present invention. Accordingly, the scope of various aspects of the present invention should not be limited by specific characteristics of the exemplary method 400.

Figure 5:
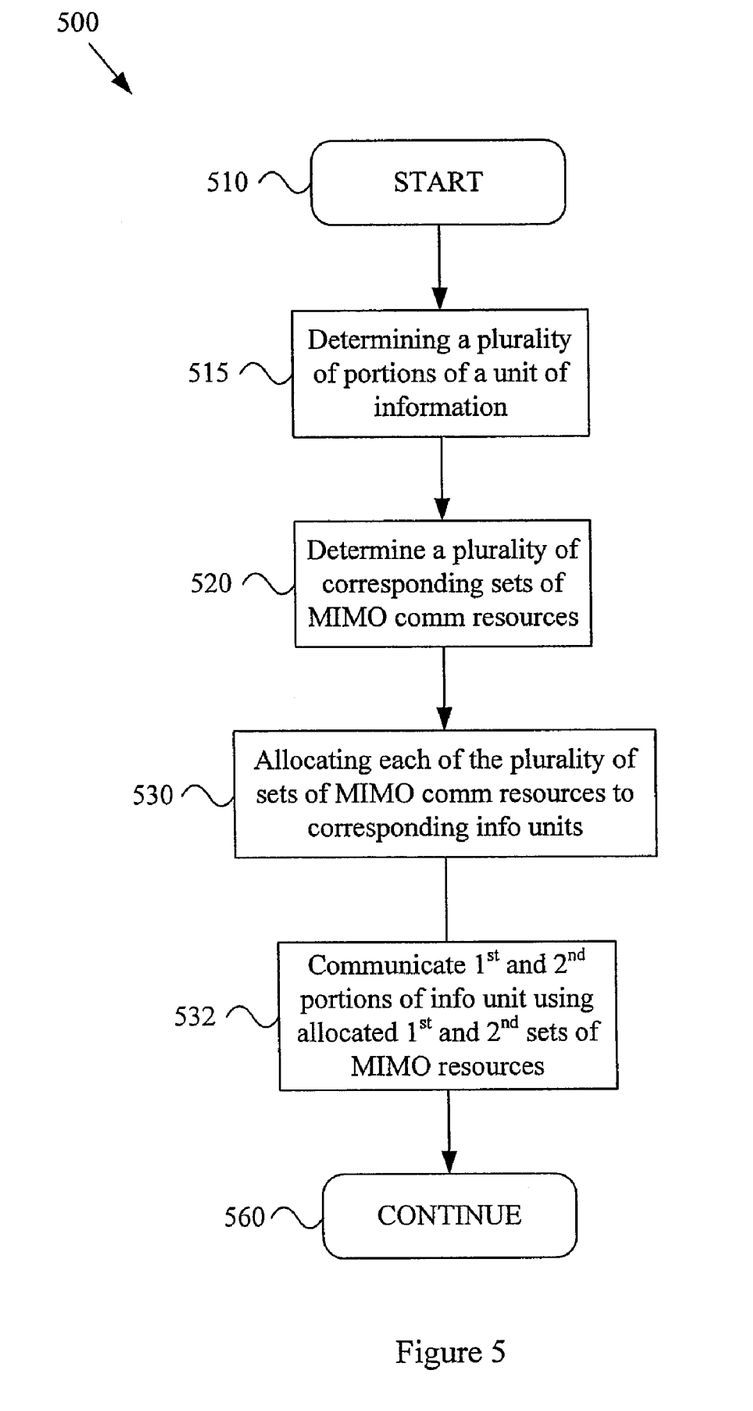
FIG. 5 is a flow diagram illustrating an exemplary method for allocating MIMO communication resources, in accordance with various aspects of the present invention.

FIG. 5 is a flow diagram illustrating an exemplary method 500 for allocating MIMO communication resources, in accordance with various aspects of the present invention. The exemplary method 500 may, for example and without limitation, share various characteristics with the exemplary methods 300, 400 illustrated in FIGS. 3-4 and discussed previously.

The exemplary method 500 may, at step 515, comprise determining a plurality of portions of the unit of information (e.g., prior to communicating the unit of information). As discussed previously with regard to step 420 of the exemplary method 400 illustrated in FIG. 4, portions of the unit of information may be determined in any of a variety of manners.

For example and without limitation, step 515 may comprise determining a first and second (to $n^{th}$) portion of the unit of information in any of a variety of manners. For example and without limitation, step 515 may comprise determining portions of the unit of information based, at least in part, on information priority or information type. For example, step 515 may comprise determining a plurality of portions of the unit of information, each of which may comprise a portion of the unit of the information to be communicated simultaneously (e.g., parallel streams of audio and video information).

The exemplary method 500 may, at step 520, comprise determining a plurality of sets of MIMO communication resources, corresponding to the plurality of portions of the unit of information (e.g., as determined at step 515), to utilize for communicating the plurality of portions. Step 520 may, for example and without limitation, share various characteristics with steps 320, 340, 420 and 440 of the exemplary methods 300, 400 illustrated in FIGS. 3-4 and discussed previously.

The exemplary method 500 may, at step 530, comprise allocating each of the plurality of sets of MIMO communication resources to a corresponding portion of the unit of information. Step 530 may, for example and without limitation, share various characteristics with steps 330, 350, 430 and 450 of the exemplary methods 300, 400 illustrated in FIGS. 3-4 and discussed previously.

The exemplary method 500 may, at step 532, comprise communicating the first and second portions of the unit of information (e.g., simultaneously) utilizing the first and second sets of MIMO communication resources, respectively (e.g., as determined at step 520 and allocated at step 530). In a non-limiting exemplary scenario, step 532 may comprise communicating a first portion of the unit of information utilizing the first set of MIMO communication resources, while communicating a second portion of the unit of information utilizing the second set of MIMO communication resources.

The exemplary method 500 was presented to provide specific illustrations of generally broader aspects of the present invention. Accordingly, the scope of various aspects of the present invention should not be limited by specific characteristics of the exemplary method 500.

Figure 6:
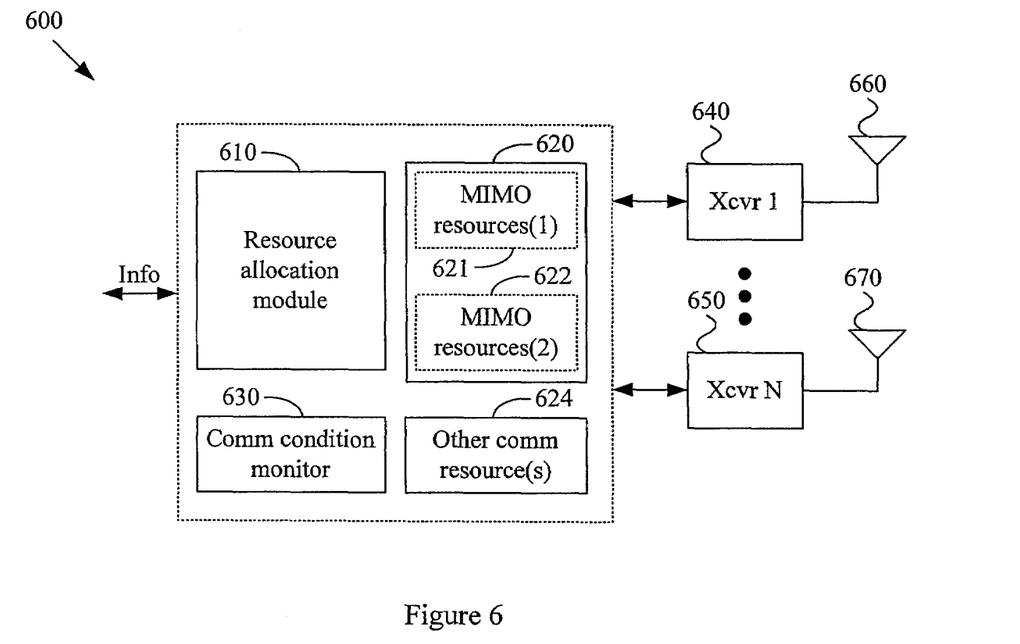
FIG. 6 is a diagram illustrating an exemplary system that allocates MIMO communication resources, in accordance with various aspects of the present invention.

FIG. 6 is a diagram illustrating an exemplary system 600 that allocates MIMO communication resources, in accordance with various aspects of the present invention. Various components of the exemplary system 600 may, for example and without limitation, share various functional characteristics with the exemplary methods 300-500 illustrated in FIGS. 3-5 and discussed previously.

The exemplary system 600 may correspond to, or be integrated with, any of a variety of communication systems with MIMO communication capability. For example and without limitation, the system 600, or portions thereof, may correspond to various modules or systems of a MIMO communication network (e.g., a base station, access point, or central controller). Also for example, the system 600 may correspond to a fixed or portable MIMO communication system that communicates with a MIMO communication network. Accordingly, the scope of various aspects of the present invention should not be limited by characteristics of a particular communication system that may correspond to, or be integrated with, the exemplary system 600.

The exemplary system 600 may comprise a resource allocation module 610 and a MIMO resource pool 620 comprising MIMO resources (e.g., a first set of MIMO processing resources 621 and a second set of MIMO processing resources 622). The exemplary system 600 may also comprise a communication condition monitor 630. The exemplary system 600 may further comprise a plurality of transceivers (e.g., a first transceiver 640 through $n^{th}$ transceiver 650) and corresponding antennas (e.g., a first antenna 660 through $n^{th}$ antenna 670). Also the exemplary system 600 may comprise other communication resources 624 (e.g., standard or non-MIMO communication resources).

The MIMO resource pool 620 (e.g., the first set of MIMO processing resources 621 and the second set of MIMO processing resources 622) may generally comprise any of a variety of MIMO communication resources. For example and without limitation, the MIMO resource pool 620 may share various characteristics or components with the exemplary MIMO systems 100, 200 illustrated in FIGS. 1-2 and discussed previously. For example, the MIMO resource pool 620 (e.g., the first and second sets of MIMO processing resources 621, 622) may comprise channel encoders, interleavers, serial-to-parallel converters, MIMO demodulators, de-interleavers, channel decoders, etc.

The MIMO resource pool 620 may generally comprise various MIMO processing resources, which may be allocated for communicating information (e.g., a unit of information or portion thereof). In a non-limiting exemplary scenario, such allocated MIMO processing resources may communicate information with a plurality of transceivers (e.g., any of the first transceiver 640 through the $n^{th}$ transceiver 650), which in turn communicate signals with a plurality of corresponding antennas (e.g., the first antenna 660 through $n^{th}$ antenna 670).

The resource allocation module 610 may allocate various MIMO communication resources for communicating information (e.g., a unit of information or portion(s) thereof). Units of information, portions thereof, and MIMO communication resources were generally discussed previously with regard to the exemplary systems 100-200 and methods 300-500 illustrated in FIGS. 1-5 and discussed previously.

The resource allocation module 610 may, for example, determine a first set of MIMO communication resources to utilize for communicating a first portion of a unit of information. The resource allocation module 610 may, for example and without limitation, share various functional characteristics with step 320 of the exemplary method 300 illustrated in FIG. 3 and discussed previously.

The resource allocation module 610 may, for example and without limitation, determine the first (or $2^{nd}$ or $n^{th}$) portion of the unit of information in any of a variety of manners, examples of which will be provided below.

The first set of MIMO communication resources may comprise any of a variety of MIMO communication resources or one or more portions thereof. For example and without limitation, the first set of MIMO communication resources may comprise a first set of MIMO processing resources 621. The first set of MIMO communication resources may also comprise a first plurality of antennas (e.g., at least a portion of the first antenna 660 through $n^{th}$ antenna 670). In a non-limiting exemplary scenario, the first set of MIMO communication resources may comprise three of four available MIMO antennas (e.g., three of the first antenna 660 through $n^{th}$ antenna 670, where n=4). Also for example and without limitation, the first set of MIMO communication resources may comprise a first plurality of transceivers (e.g., a plurality of the first transceiver 640 through $n^{th}$ transceiver 650). In a non-limiting exemplary scenario, the first set of MIMO communication resources may comprise two of four available transceivers (e.g., two of the first transceiver 640 through $n^{th}$ transceiver 650, where n=4).

The resource allocation module 610 may determine the first set of MIMO communication resources in any of a variety of manners. For example and without limitation, the resource allocation module 610 may determine the minimum number of MIMO communication resources necessary to meet minimum communication quality goals for the first portion of the unit of information. Also for example, the resource allocation module 610 may determine the number of MIMO communication resources that may communicate the first portion of the unit of information in the most energy-efficient manner. Further for example, the resource allocation module 610 may determine the first set of MIMO communication resources based, at least in part, on the available MIMO communication resources at other communication systems. Accordingly, the scope of various aspects of the present invention should not be limited by characteristics of any particular manner of determining a set of MIMO communication resources or corresponding apparatus for making such determination.

The resource allocation module 610 may, for example, allocate the first set of MIMO communication resources for communicating the first portion of the unit of information. The resource allocation module 610 may, for example and without limitation, share various functional characteristics with step 330 of the exemplary method 300 illustrated in FIG. 3 and discussed previously.

The resource allocation module 610 may perform such allocation in any of a variety of manners. The resource allocation module 610 may, for example, perform such allocating by cross-listing the first set of MIMO communication resources with the first portion of information. Also for example, the resource allocation module 610 may perform such allocating utilizing allocation flags, arrays and/or tables. Accordingly, the scope of various aspects of the present invention should not be limited by characteristics of any particular manner of performing a resource allocation or corresponding apparatus for performing such allocation.

The resource allocation module 610 may, for example, determine a second set of MIMO communication resources to utilize for communicating a second portion of the unit of information, the second set of MIMO communication resources being different from the first set of MIMO communication resources. The resource allocation module 610 may, for example and without limitation, share various characteristics with step 340 of the exemplary method 300 illustrated in FIG. 3 and discussed previously.

As will be illustrated later by example, the resource allocation module 610 may make such a determination at any of a variety of times and in response to any of a variety of conditions. For example and without limitation, the resource allocation module 610 may make such a determination prior to communicating the unit of information (e.g., prior to beginning communication of the first and second portions of the unit of information). Also for example, the resource allocation module 610 may make such a determination during or after communication of the first portion of the unit of information and prior to communication of the second portion of the unit of information. Accordingly, the scope of various aspects of the present invention should not be limited by characteristics of any particular timing or initiating condition for determining the second set of MIMO communication resources.

As discussed previously, the second portion of the unit of information may be related to the first portion of the unit of information in any of a variety of manners. For example and without limitation, the first and second portions may correspond to different priority information of the unit of information, different media, different types of information, etc. Accordingly, the scope of various aspects of the present invention should not be limited by characteristics of a particular portion or component of a unit of information.

The second set of MIMO communication resources may be generally different (i.e., not having exactly the same membership) from the first set of MIMO communication resources. In a non-limiting exemplary scenario, the first set of MIMO communication resources might comprise all of the available antennas (e.g., the first antenna 660 through $n^{th}$ antenna 670), while the second set of MIMO communication resources might comprise less than all of the available antennas (e.g., the first antenna 660 through $m^{th}$ antenna, where m<n). In another non-limiting example, the first set of MIMO communication resources might have a first and second transceiver (e.g., the first transceiver 640 and a second transceiver), while the second set of MIMO communication resources might have a first, second and third transceiver (e.g., the first transceiver 640 and two other transceivers). In another non-limiting example, the first set of MIMO communication resources might comprise first, second and third antennas and associated transceivers, while the second set of MIMO communication resources might comprise only a fourth antenna and associated transceiver.

In a further non-limiting example, the first set of MIMO communication resources might comprise a relatively large amount of available MIMO communication resources, and the second set of MIMO communication resources might comprise a relatively small amount of available MIMO communication resources. In another non-limiting exemplary scenario, the first set of MIMO communication resources might generally correspond to relatively high reliability communications, while the second set of MIMO communication resources might generally correspond to relatively low reliability communications. There may be overlapping members of the first and second sets of MIMO communication resources, but such overlapping membership is not necessary.

In general, the second set of MIMO communication resources may be generally different (i.e., not having exactly the same membership) from the first set of MIMO communication resources. Accordingly, the scope of various aspects of the present invention should not be limited by characteristics of particular respective memberships of the first and second sets of MIMO communication resources.

The resource allocation module 610 may, for example, allocate the second set of MIMO communication resources for communicating the second portion of the unit of information. The resource allocation module 610 may, for example and without limitation, share various functional characteristics with step 350 of the exemplary method 300 illustrated in FIG. 3 and discussed previously.

The resource allocation module 610 may perform such allocation in any of a variety of manners. The resource allocation module 610 may, for example, perform such allocating by cross-listing the second set of MIMO communication resources with the second portion of the unit of information. Also for example, the resource allocation module 610 may perform such allocating utilizing allocation flags, arrays and/or tables. Accordingly, the scope of various aspects of the present invention should not be limited by characteristics of any particular manner of performing a resource allocation or apparatus for performing such allocation.

The exemplary system 600 may, for example and without limitation, perform any of a variety of additional communication-related processing. For example and without limitation, the exemplary system 600 may communicate the first and second portions of the unit of information utilizing the first and second sets of MIMO communication resources, respectively. As will be discussed later with exemplary illustrations, the exemplary system 600 may communicate the first and second portions of the unit of information in series or parallel (i.e., consecutively or simultaneously).

The exemplary system 600 may, for example and without limitation, comprise a user interface, module that performs user interface functions. The exemplary system 600 may also, for example, comprise a communication condition monitor 630, which monitors communication quality and/or communication conditions associated with communicating the unit of information. The exemplary system 600 may communicate additional units of information. The exemplary system 600 (e.g., utilizing the resource allocation module 610) may determine and allocate MIMO communication resources for communicating next portions of the unit of information or other units of information. The scope of various aspects of the present invention should not be limited by characteristics of particular types of additional processing that may be performed by the exemplary system 600.

The following discussion will, by way of example, illustrate various additional aspects of the present invention. The specific exemplary illustrations generally provide specific examples of generally broader aspects of the present invention, and accordingly, the scope of various aspects of the present invention should not be limited by characteristics of the exemplary illustrations.

In a first exemplary scenario, the resource allocation module 610 may determine a first set of MIMO communication resources to utilize for communicating a first portion of a unit of information. The resource allocation module 610 may, for example and without limitation, share various functional characteristics with step 420 of the exemplary method 400 illustrated in FIG. 4 and discussed previously.

For example, the resource allocation module 610 may determine the first (or $2^{nd}$ or $n^{th}$) portion of the unit of information (e.g., to which the determined first set of MIMO communication resources may correspond) in any of a variety of manners. For example and without limitation, the resource allocation module 610 may determine the first portion of the unit of information based, at least in part, on information priority. For example, the resource allocation module 610 may determine that a unit of information comprises information of different types, each of which having a corresponding priority. In a non-limiting example, the resource allocation module 610 may determine that a first portion of a videoconference comprises audio information, which may have a higher priority than a second portion of the videoconference comprising video information. In another non-limiting example, the resource allocation module 610 may determine that a first portion of a telephone communication comprises communication support information, which may have a higher priority than a second portion of the telephone communication comprising general voice information.

Also for example and without limitation, the resource allocation module 610 may determine the first portion of the unit of information to be the entire unit of information (e.g., at least for the time being). In a non-limiting example, the resource allocation module 610 may determine that the first portion of the unit of information is the entire unit of information, until an event occurs that causes the resource allocation module 610 to determine a second portion of the unit of information. Such an event may comprise characteristics of any of a variety of communication events, including by not limited to, noise conditions, user input, changing geographical location, change in communicated information, changing multi-path conditions, changing energy supply, component failure, etc.

In general, in various non-limiting examples, the resource allocation module 610 may determine the first portion of the unit of information. Accordingly, the scope of various aspects of the present invention should not be limited by characteristics of any particular manner of making such determination or apparatus for making such determination.

Continuing the first exemplary scenario, the resource allocation module 610 may allocate the first set of MIMO communication resources for communicating the first portion of the unit of information. The resource allocation module 610 may, for example and without limitation, share various functional characteristics with step 430 of the exemplary method 400 illustrated in FIG. 4 and discussed previously.

Continuing the first exemplary scenario, the exemplary system 600 may communicate the first portion of the unit of information utilizing the first set of MIMO communication resources (e.g., as previously determined and allocated by the resource allocation module 610). The communication system 600 may, for example and without limitation, share various functional characteristics with step 432 of the exemplary method 400 illustrated in FIG. 4 and discussed previously.

For example, the exemplary system 600 may communicate the first portion of the unit of information in any of a variety of manners. For example and without limitation, the exemplary system 600 may utilize MIMO communication resources (e.g., one or more MIMO encoders of the MIMO resource pool 620) to encode the first portion of the unit of information in accordance with a first MIMO encoding scheme. In a non-limiting example, where the first set of MIMO communication resources includes two of four available antennas (e.g., the first antenna 660 and a second antenna), the exemplary system 600 may utilize a MIMO encoder (e.g., of the first set of MIMO processing resources 621) to encode the first portion of the unit of information in accordance with an order-2 MIMO encoding scheme, and then transmit the encoded information from the two allocated antennas. The exemplary system 600 may, for example, perform such communication by initially communicating MIMO training information to the recipient(s) of the communication. The scope of various aspects of the present invention should not be limited by any particular manner of communicating information utilizing a set of MIMO communication resources.

Continuing the first exemplary scenario, the exemplary system 600 may, while communicating the first portion of the unit of information, utilize the communication condition monitor 630 to monitor communication conditions. The exemplary system 600 (e.g., the communication condition monitor 630) may share various functional characteristics with step 434 of the exemplary method 400 illustrated in FIG. 4 and discussed previously.

As discussed previously, such communication conditions may comprise any of a variety of communication conditions. Accordingly, the scope of various aspects of the present invention should not be limited by characteristics of any particular communication condition that may be monitored during communication of the first portion of the unit of information.

Continuing the first exemplary scenario, the exemplary system 600 may, for example, determine whether to adjust the MIMO communication resource allocation for a next (or second) portion of the unit of information. The exemplary system 600 may, for example and without limitation, share various characteristics with step 436 of the exemplary method 400 illustrated in FIG. 4 and discussed previously.

The exemplary system 600 may, for example, make such a determination based, at least in part, on communication conditions monitored by the communication condition monitor 630. For example, a significant change in one or more communication conditions during communication of the first portion of the unit of information may warrant a change in MIMO communication resources allocated to communicate a second portion of the unit of information.

In a first non-limiting example, the first set of MIMO communication resources may comprise all four of four available antennas (e.g., the first antenna 660 through $n^{th}$ antenna 670, where n=4). Due to a detected change in multi-path communication conditions (e.g., a communicating system moving into a wide open area) monitored by the communication condition monitor 630, the exemplary system 600 may determine that a different set of MIMO communication resources may be more appropriate for communicating a second portion of the unit of information.

In a second non-limiting example, the first set of MIMO communication resources may comprise two of four available antennas (e.g., the first antenna 660 and a second antenna of the n antennas, where n=4). Due to a detected significant increase in noise level monitored by the communication condition monitor 630, the exemplary system 600 may determine that a different set of MIMO communication resources may be more appropriate for communicating a second portion of the unit of information.

In a third non-limiting example, the first set of MIMO communication resources may comprise three of four available transceivers (e.g., the first transceiver 640 and second and third transceivers of the n transceivers, where n=4). Due to a detected significant change in the amount of energy remaining for communication (e.g., monitored by the communication condition monitor 630), the exemplary system 600 may determine that a different set of MIMO communication resources may be more appropriate for communicating a second portion of the unit of information (e.g., to conserve energy).

In a fourth non-limiting example, the first set of MIMO communication resources may comprise two of four antennas (e.g., the first antenna 660 and a second antenna of the n antennas, where n=4). Due to a detected user request for higher quality communications (e.g., detected by the communication condition monitor 630 working in conjunction with a user interface module), the exemplary system 600 may determine that a different set of MIMO communication resources may be more appropriate for communicating a second portion of the unit of information.

If an adjustment in allocated MIMO communication resources is not warranted, the exemplary system 600 may continue monitoring communication conditions while communicating the unit of information. If an adjustment in allocated MIMO communication resources is warranted, the exemplary system 600 may utilize the resource allocation module 610 to perform such re-allocation.

In general, the exemplary system 600 may determine whether to adjust the MIMO communication resource allocation for a next (or second) portion of the unit of information. Accordingly, the scope of various aspects of the present invention should not be limited by characteristics of any particular criterion for making such determination or apparatus for making such determination.

Continuing the first exemplary scenario, the resource allocation module 610 may determine a second set of MIMO communication resources to utilize for communicating a second portion of the unit of information, the second set of MIMO communication resources being different from the first set of MIMO communication resources. The resource allocation module may, for example and without limitation, share various functional characteristics with step 440 of the exemplary method 400 illustrated in FIG. 4 and discussed previously.

Continuing the non-limiting examples discussed previously with regard to determining whether to adjust the MIMO communication resource allocation, in the first non-limiting example, due to a detected change in multi-path communication conditions (e.g., a communicating system moving into a wide open area) monitored by the communication condition monitor 630, the resource allocation module 610 may determine that only two antennas or one antenna may be more appropriate for communicating a second portion of the unit of information. In the second non-limiting example, due to a detected significant increase in monitored noise level, the resource allocation module 610 may determine that an increased number of MIMO communication resources may be more appropriate for communicating a second portion of the unit of information.

In the third non-limiting example, due to a detected reduction in the amount of energy remaining for communication (e.g., monitored by the communication condition monitor 630 in conjunction with power supply circuitry), the resource allocation module 610 may determine that a lesser amount (or greater amount, depending on the exact conditions) of MIMO communication resources may be more appropriate for communicating a second portion of the unit of information. In the fourth non-limiting example, due to a detected user request for higher quality communications (e.g., monitored by the communication condition monitor 630 in conjunction with user interface circuitry), the resource allocation module 610 may determine that the full set of MIMO communication resources be utilized for communicating a second portion of the unit of information.

In general, the resource allocation module 610 may determine a second set of MIMO communication resources to utilize for communicating a second portion of the unit of information, the second set of MIMO communication resources being different from the first set of MIMO communication resources. Accordingly, the scope of various aspects of the present invention should not be limited by characteristics of any particular set of MIMO communication resources, any particular manner of determining a set of MIMO communication resources to utilize for communication, or apparatus for making such determination.

Continuing the first exemplary scenario, the resource allocation module 610 may, for example, allocate the second set of MIMO communication resources for communicating the second portion of the unit of information. The resource allocation module 610 may, for example and without limitation, share various functional characteristics with step 450 of the exemplary method 400 illustrated in FIG. 4 and discussed previously.

Continuing the first exemplary scenario, the exemplary system 600 may, for example, communicate the second portion of the unit of information utilizing the second set of MIMO communication resources (e.g., as determined and allocated for such communication by the resource allocation module 610). The exemplary system 600 may, for example and without limitation, share various functional characteristics with step 452 of the exemplary method 400 illustrated in FIG. 4 and discussed previously.

Continuing the first exemplary scenario, the exemplary system 600 may, for example, perform additional processing. The exemplary system 600 may, for example and without limitation, share various functional characteristics with step 460 of the exemplary method 400 illustrated in FIG. 4 and discussed previously.

For example, the exemplary system 600 may utilize a user interface module to perform user interface processing. Also for example, the exemplary system 600 may complete communication of the second portion of the unit of information utilizing the second set of MIMO communication resources. Further for example, the exemplary system 600 may utilize the communication condition monitor 630 during communication of the second portion of the unit of information to monitor communication conditions (e.g., with the potential to change to a third or $n^{th}$ set of allocated MIMO communication resources for communicating a third or $n^{th}$ portion of the unit of information). The scope of various aspects of the present invention should not be limited by characteristics of any particular additional processing.

The first non-limiting exemplary scenario was presented to provide specific illustrations of generally broader aspects of the present invention. Accordingly, the scope of various aspects of the present invention should not be limited by specific characteristics of the first non-limiting exemplary scenario.

In a second non-limiting exemplary scenario, the exemplary system 600 (e.g., the resource allocation module 610 or other module thereof) may, for example, determine a plurality of portions of the unit of information (e.g., prior to the exemplary system 600 communicating the unit of information). The exemplary system 600 (e.g., the resource allocation module 610 or other module thereof) may, for example and without limitation, share various functional characteristics with step 515 of the exemplary method 500 illustrated in FIG. 5 and discussed previously.

As discussed previously (e.g., with regard to step 420 of the exemplary method 400 illustrated in FIG. 4), portions of the unit of information may be determined in any of a variety of manners. For example and without limitation, the exemplary system 600 may determine a first and second (to $n^{th}$) portion of the unit of information in any of a variety of manners. For example and without limitation, the exemplary system 600 may determine a plurality of portions of the unit of information based, at least in part, on information priority or information type. For example, the exemplary system 600 may determine a plurality of portions of the unit of information, each of which may comprise a portion of the unit of the information to be communicated simultaneously (e.g., parallel streams of audio and video information).

Continuing the second exemplary scenario, the exemplary system 600 may, for example, utilize the resource allocation module 610 to determine a plurality of sets of MIMO communication resources, corresponding to the plurality of portions of the unit of information (e.g., as determined previously by the exemplary system 600), to utilize for communicating the unit of information. The resource allocation module 610 may, for example and without limitation, share various functional characteristics with step 520 of the exemplary method 500 illustrated in FIG. 5 and discussed previously.

Continuing the second exemplary scenario, the resource allocation module 610 may, for example, allocate each of the plurality of sets of MIMO communication resources to a corresponding portion of the unit of information. The resource allocation module 610 may, for example and without limitation, share various functional characteristics with step 530 of the exemplary method 500 illustrated in FIG. 5 and discussed previously.

Continuing the second exemplary scenario, the exemplary system 600 may, for example, communicate the first and second portions of the unit of information (e.g., simultaneously) utilizing the first and second sets of MIMO communication resources, respectively (e.g., as determined by the resource allocation module 610). In a non-limiting example, the exemplary system 600 may communicate a first portion of the unit of information utilizing the first set of MIMO communication resources, while communicating a second portion of the unit of information utilizing the second set of MIMO communication resources.

The second non-limiting exemplary scenario was presented to provide specific illustrations of generally broader aspects of the present invention. Accordingly, the scope of various aspects of the present invention should not be limited by specific characteristics of the second non-limiting exemplary scenario.

The exemplary system 600, and modules thereof, may be implemented in hardware, software or a combination thereof. Also, various modules may share various hardware and/or software sub-modules. As a non-limiting example, a first module and a second module may share processing hardware or may share various software code segments. Accordingly, the scope of various aspects of the present invention should not be limited by any particular hardware or software implementation of the exemplary system 600 (or portions thereof) or by any arbitrary notion of boundaries between modules.

In addition, the exemplary system 600 may be implemented in any of a variety of degrees of integration. For example, the entire system 600 may be implemented on a single integrated circuit. Also for example, the entire system 600, except for the antennas, may be integrated on a single integrated circuit. Further for example, the exemplary system 600 may be implemented on a plurality of integrated circuits. Accordingly, the scope of various aspects of the present invention should not be limited by characteristics of a particular degree of integration or distribution.

In summary, various aspects of the present invention provide a system and method for providing dynamic allocation of MIMO communication resources across a single communication. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a MIMO communication system, a method for allocating MIMO communication resources of a portable MIMO communication system, the method comprising:
   determining a first set of MIMO communication resources of a portable first MIMO communication system to utilize for communicating a first portion of a unit of information from the portable first MIMO communication system to a second MIMO communication system, where the unit of information is a quantifiable amount of related information;
   allocating the first set of MIMO communication resources for communicating the first portion of the unit of information;
   determining a second set of MIMO communication resources of the portable first MIMO communication system to utilize for communicating a second portion of the unit of information from the portable first MIMO communication system to the second MIMO communication system, at least a portion of the second set of MIMO communication resources being different from the first set of MIMO communication resources; and
   allocating the second set of MIMO communication resources for communicating the second portion of the unit of information.

2. The method of claim 1, further comprising utilizing the allocated second set of MIMO communication resources to communicate the second portion of the unit of information from the portable first MIMO communication system to the second MIMO communication system after utilizing the allocated first set of MIMO communication resources to communicate the first portion of the unit of information from the portable first MIMO communication system to the second MIMO communication system.

3. The method of claim 1, further comprising utilizing the allocated second set of MIMO communication resources to communicate the second portion of the unit of information from the portable first MIMO communication system to the second MIMO communication system while utilizing the allocated first set of MIMO communication resources to communicate the first portion of the unit of information from the portable first MIMO communication system to the second MIMO communication system.

4. The method of claim 1, further comprising communicating the first portion of the unit of information from the portable first MIMO communication system to the second MIMO communication system utilizing the allocated first set of MIMO communication resources, and wherein determining a second set of MIMO communication resources of the portable first MIMO communication system to utilize for communicating a second portion of the unit of information to the second MIMO communication system comprises determining at least a portion of the second set of MIMO communication resources after starting communicating the first portion of the unit of information.

5. The method of claim 4, wherein determining a second set of MIMO communication resources of the portable first MIMO communication system to utilize for communicating a second portion of the unit of information to the second MIMO communication system comprises determining the second set of MIMO communication resources in response to communication conditions determined during communicating the first portion of the unit of information.

6. The method of claim 1, wherein the first portion of the unit of information primarily comprises communication-support information, and the second portion of the unit of information primarily comprises general information.

7. The method of claim 1, wherein the first portion of the unit of information primarily comprises information of a first medium of multi-media communication, and the second portion of the unit of information primarily comprises a second medium of multi-media communication that is different from the first medium.

8. The method of claim 1, further comprising determining the first and second portions of the unit of information based, at least in part, on information priority.

9. The method of claim 1, wherein the first set of MIMO communication resources comprises a first plurality of antennas, and the second set of MIMO communication resources comprises a second plurality of antennas, the second plurality and the first plurality being different by at least one antenna.

10. The method of claim 9, wherein the first plurality of antennas and the second plurality of antennas share at least one antenna.

11. The method of claim 1, further comprising encoding the first portion of the unit of information in accordance with a first MIMO encoding scheme, and encoding the second portion of the unit of information in accordance with a second MIMO encoding scheme that is different from the first MIMO encoding scheme.

12. The method of claim 1, wherein the unit of information is a multi-media program.

13. The method of claim 1, wherein the unit of information is a telephone call.

14. The method of claim 1, wherein:
  the unit of information comprises a plurality of parallel streams of information;
  the first portion of the unit of information comprises at least a first stream of the plurality of parallel streams; and
  the second portion of the unit of information comprises at least a second stream of the plurality of parallel streams.

15. The method of claim 1, wherein the first set of MIMO communication resources comprises a first plurality of transceivers of the portable first MIMO communication system, and the second set of MIMO communication resources comprises a second plurality of transceivers of the portable first MIMO communication system different from the first plurality of transceivers.

16. The method of claim 1, wherein determining a first set of MIMO communication resources comprises determining a set of MIMO communication resources of the portable first MIMO communication system that will communicate the first portion of the unit of information in the most energy-efficient manner.

17. The method of claim 1, wherein determining a second set of MIMO communication resources comprises determining the second set of MIMO communication resources of the portable first MIMO communication system in response to a significant change in amount of energy remaining for communication in the portable first MIMO communication system.

18. The method of claim 1, wherein determining a second set of MIMO communication resources comprises determining the second set of MIMO communication resources of the portable first MIMO communication system in response to a user request for higher quality communication.

19. In a MIMO communication system, a method for allocating MIMO communication resources of a portable first MIMO communication system, the method comprising, prior to communicating a unit of information:
  determining a plurality of portions of the unit of information, where the unit of information is a quantifiable amount of related information;
  determining a plurality of different respective sets of MIMO communication resources of a portable first MIMO communication system, corresponding to the plurality of portions of the unit of information, to utilize for communicating the unit of information from the portable first MIMO communication system to a second MIMO communication system in respective MIMO transmissions, where the plurality of respective sets are different from each other; and
  allocating each of the plurality of sets of MIMO communication resources to a corresponding portion of the plurality of portions.

20. The method of claim 19, wherein communicating the unit of information comprises communicating a plurality of different types of information, and determining a plurality of portions of the unit of information comprises identifying at least a portion of the different types of information.

21. In a MIMO communication system, a sub-system for allocating MIMO communication resources of a portable first MIMO communication system, the sub-system comprising at least one module that operates to, at least:
  determine a first set of MIMO communication resources of a portable first MIMO communication system to utilize for communicating a first portion of a unit of information from the portable first MIMO communication system to a second MIMO communication system, where the unit of information is a quantifiable amount of related information;
  allocate the first set of MIMO communication resources for communicating the first portion of the unit of information;
  determine a second set of MIMO communication resources of the portable first MIMO communication system to utilize for communicating a second portion of the unit of information from the portable first MIMO communication system to the second MIMO communication system, at least a portion of the second set of MIMO communication resources being different from the first set of MIMO communication resources; and
  allocate the second set of MIMO communication resources for communicating the second portion of the unit of information.

22. The sub-system of claim 21, wherein the at least one module operates to utilize the allocated second set of MIMO communication resources to communicate the second portion of the unit of information from the portable first MIMO communication system to the second MIMO communication system after utilizing the allocated first set of MIMO communication resources to communicate the first portion of the unit of information from the portable first MIMO communication system to the second MIMO communication system.

23. The sub-system of claim 21, wherein the at least one module operates to utilize the allocated second set of MIMO communication resources to communicate the second portion of the unit of information from the portable first MIMO communication system to the second MIMO communication system while utilizing the allocated first set of MIMO communication resources to communicate the first portion of the unit of information from the portable first MIMO communication system to the second MIMO communication system.

24. The sub-system of claim 21, wherein the at least one module operates to communicate the first portion of the unit of information from the portable first MIMO communication system to the second MIMO communication system utilizing the allocated first set of MIMO communication resources, and wherein the at least one module operates to determine a second set of MIMO communication resources of the portable first MIMO communication system to utilize for communicating a second portion of the unit of information to the second MIMO communication system by, at least in part, determining at least a portion of the second set of MIMO communication resources after communication of the first portion of the unit of information begins.

25. The sub-system of claim 24, wherein the at least one module operates to determine a second set of MIMO communication resources of the portable first MIMO communication system to utilize for communicating a second portion of the unit of information to the second MIMO communication system by, at least in part, determining the second set of MIMO communication resources in response to communication conditions determined during communicating the first portion of the unit of information.

26. The sub-system of claim 21, wherein the first portion of the unit of information primarily comprises communication-support information, and the second portion of the unit of information primarily comprises general information.

27. The sub-system of claim 21, wherein the first portion of the unit of information primarily comprises information of a first medium of multi-media communication, and the second portion of the unit of information primarily comprises a second medium of multi-media communication that is different from the first medium.

28. The sub-system of claim 21, comprising at least one module that operates to determine the first and second portions of the unit of information based, at least in part, on information priority.

29. The sub-system of claim 21, wherein the first set of MIMO communication resources comprises a first plurality of antennas, and the second set of MIMO communication resources comprises a second plurality of antennas, the second plurality and the first plurality being different by at least one antenna.

30. The sub-system of claim 29, wherein the first plurality of antennas and the second plurality of antennas share at least one antenna.

31. The sub-system of claim 21, wherein the at least one module operates to encode the first portion of the unit of information in accordance with a first MIMO encoding scheme, and encode the second portion of the unit of information in accordance with a second MIMO encoding scheme that is different from the first MIMO encoding scheme.

32. The sub-system of claim 21, wherein the unit of information is a multi-media program.

33. The sub-system of claim 21, wherein the unit of information is a telephone call.

34. The sub-system of claim 21, wherein:
the unit of information comprises a plurality of parallel streams of information;
the first portion of the unit of information comprises at least a first stream of the plurality of parallel streams; and
the second portion of the unit of information comprises at least a second stream of the plurality of parallel streams.

35. In a MIMO communication system, a method for allocating MIMO communication resources, the method comprising:
determining a first set of MIMO communication resources of a portable first MIMO communication system to utilize for communicating a first portion of a telephone conversation from the portable first MIMO communication system to a second MIMO communication system;
allocating the first set of MIMO communication resources for communicating the first portion of the telephone conversation from the portable first MIMO communication system to the second MIMO communication system;
determining a second set of MIMO communication resources of the portable first MIMO communication system to utilize for communicating a second portion of the telephone conversation from the portable first MIMO communication system to the second MIMO communication system, at least a portion of the second set of MIMO communication resources being different from the first set of MIMO communication resources; and
allocating the second set of MIMO communication resources for communicating the second portion of the telephone conversation from the portable first MIMO communication system to the second MIMO communication system.

36. The method of claim 35, further comprising utilizing the allocated second set of MIMO communication resources to communicate the second portion of the telephone conversation from the portable first MIMO communication system to the second MIMO communication system after utilizing the allocated first set of MIMO communication resources to communicate the first portion of the telephone conversation from the portable first MIMO communication system to the second MIMO communication system.

37. The method of claim 35, further comprising utilizing the allocated second set of MIMO communication resources to communicate the second portion of the telephone conversation from the portable first MIMO communication system to the second MIMO communication system while utilizing the allocated first set of MIMO communication resources to communicate the first portion of the telephone conversation from the portable first MIMO communication system to the second MIMO communication system.

38. The method of claim 35, further comprising communicating the first portion of the telephone conversation from the portable first MIMO communication system to the second MIMO communication system utilizing the allocated first set of MIMO communication resources, and wherein determining a second set of MIMO communication resources of the portable first MIMO communication system to utilize for communicating a second portion of the telephone conversation to the second MIMO communication system comprises determining at least a portion of the second set of MIMO communication resources after starting communicating the first portion of the telephone conversation.

39. The method of claim 35, wherein determining a second set of MIMO communication resources of the portable first MIMO communication system to utilize for communicating a second portion of the telephone conversation to the second MIMO communication system comprises determining the second set of MIMO communication resources in response to communication conditions determined during communicating the first portion of the telephone conversation.

40. The method of claim 35, wherein the first set of MIMO communication resources comprises a first plurality of antennas, and the second set of MIMO communication resources comprises a second plurality of antennas, the second plurality and the first plurality being different by at least one antenna.

41. The method of claim 40, wherein the first plurality of antennas and the second plurality of antennas share at least one antenna.

42. The method of claim 35, further comprising encoding the first portion of the telephone conversation in accordance with a first MIMO encoding scheme, and encoding the second portion of the telephone conversation in accordance with a second MIMO encoding scheme that is different from the first MIMO encoding scheme.

43. The method of claim 35, wherein the first set of MIMO communication resources comprises a first plurality of transceivers of the portable first MIMO communication system, and the second set of MIMO communication resources comprises a second plurality of transceivers of the portable first MIMO communication system different from the first plurality of transceivers.

44. In a MIMO communication system, a sub-system for allocating MIMO communication resources of a portable first MIMO communication system, the sub-system comprising at least one module that operates to, at least:
determine a first set of MIMO communication resources of a portable first MIMO communication system to utilize for communicating a first portion of a telephone conversation from the portable first MIMO communication system to a second MIMO communication system;
allocate the first set of MIMO communication resources for communicating the first portion of the telephone conversation from the portable first MIMO communication system to the second MIMO communication system;
determine a second set of MIMO communication resources of the portable first MIMO communication system to utilize for communicating a second portion of the telephone conversation from the portable first MIMO communication system to the second MIMO communication system, at least a portion of the second set of MIMO communication resources being different from the first set of MIMO communication resources; and allocate the second set of MIMO communication resources for communicating the second portion of the telephone conversation from the portable first MIMO communication system to the second MIMO communication system.

45. The sub-system of claim 44, wherein the at least one module operates to utilize the allocated second set of MIMO communication resources to communicate the second portion of the telephone conversation from the portable first MIMO communication system to the second MIMO communication system after utilizing the allocated first set of MIMO communication resources to communicate the first portion of the telephone conversation from the portable first MIMO communication system to the second MIMO communication system.

46. The sub-system of claim 44, wherein the at least one module operates to utilize the allocated second set of MIMO communication resources to communicate the second portion of the telephone conversation from the portable first MIMO communication system to the second MIMO communication system while utilizing the allocated first set of MIMO communication resources to communicate the first portion of the telephone conversation from the portable first MIMO communication system to the second MIMO communication system.

47. The sub-system of claim 44, wherein the at least one module operates to communicate the first portion of the telephone conversation from the portable first MIMO communication system to the second MIMO communication system utilizing the allocated first set of MIMO communication resources, and operates to determine a second set of MIMO communication resources of the portable first MIMO communication system to utilize for communicating a second portion of the telephone conversation to the second MIMO communication system by, at least in part, determining at least a portion of the second set of MIMO communication resources after starting communicating the first portion of the telephone conversation.

48. The sub-system of claim 44, wherein the at least one module operates to determine a second set of MIMO communication resources of the portable first MIMO communication system to utilize for communicating a second portion of the telephone conversation to the second MIMO communication system by, at least in part, determining the second set of MIMO communication resources in response to communication conditions determined during communicating the first portion of the telephone conversation.

49. The sub-system of claim 44, wherein the first set of MIMO communication resources comprises a first plurality of antennas, and the second set of MIMO communication resources comprises a second plurality of antennas, the second plurality and the first plurality being different by at least one antenna.

50. The sub-system of claim 49, wherein the first plurality of antennas and the second plurality of antennas share at least one antenna.

51. The sub-system of claim 44, wherein the at least one module operates to encode the first portion of the telephone conversation in accordance with a first MIMO encoding scheme, and encode the second portion of the telephone conversation in accordance with a second MIMO encoding scheme that is different from the first MIMO encoding scheme.

52. The sub-system of claim 44, wherein the first set of MIMO communication resources comprises a first plurality of transceivers of the portable first MIMO communication system, and the second set of MIMO communication resources comprises a second plurality of transceivers of the portable first MIMO communication system different from the first plurality of transceivers.

53. The sub-system of claim 21, wherein the first set of MIMO communication resources comprises a first plurality of transceivers of the portable first MIMO communication system, and the second set of MIMO communication resources comprises a second plurality of transceivers of the portable first MIMO communication system different from the first plurality of transceivers.

54. The sub-system of claim 21, wherein the at least one module is operable to determine the first set of MIMO communication resources by, at least in part, operating to determine a set of MIMO communication resources of the portable first MIMO communication system that will communicate the first portion of the unit of information in the most energy-efficient manner.

55. The sub-system of claim 21, wherein the at least one module is operable to determine the second set of MIMO communication resources by, at least in part, operating to determine the second set of MIMO communication resources of the portable first MIMO communication system in response to a significant change in amount of energy remaining for communication in the portable first MIMO communication system.

56. The sub-system of claim 21, wherein the at least one module is operable to determine the second set of MIMO communication resources by, at least in part, operating to determine the second set of MIMO communication resources of the portable first MIMO communication system in response to a user request for higher quality communication.

57. In a MIMO communication system, a sub-system for allocating MIMO communication resources of a portable first MIMO communication system, the sub-system comprising at least one module that is operable to, at least:
prior to communicating a unit of information:
determine a plurality of portions of the unit of information, where the unit of information is a quantifiable amount of related information;
determine a plurality of different respective sets of MIMO communication resources of a portable first MIMO communication system, corresponding to the plurality of portions of the unit of information, to utilize for communicating the unit of information from the portable first MIMO communication system to a second MIMO communication system in respective MIMO transmissions, where the plurality of respective sets are different from each other; and
allocate each of the plurality of sets of MIMO communication resources to a corresponding portion of the plurality of portions.

58. The sub-system of claim 57, wherein communicating the unit of information comprises communicating a plurality of different types of information, and the at least one module is operable to determine a plurality of portions of the unit of information by, at least in part, identifying at least a portion of the different types of information.

* * * * *